US010726735B1

(12) United States Patent
LeVake et al.

(10) Patent No.: US 10,726,735 B1
(45) Date of Patent: Jul. 28, 2020

(54) SIMULATION AND TRAINING WITH VIRTUAL PARTICIPANTS IN A REAL-WORLD ENVIRONMENT

(71) Applicant: Rockwell Collins, Inc., Cedar Rapids, IA (US)

(72) Inventors: Andrew J. LeVake, Cedar Rapids, IA (US); Adam W. Pfab, Cedar Rapids, IA (US); Nicholas A. Barbaro, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 175 days.

(21) Appl. No.: 15/253,019

(22) Filed: Aug. 31, 2016

(51) Int. Cl.
*A63F 13/00* (2014.01)
*G09B 9/00* (2006.01)
*G09B 5/02* (2006.01)

(52) U.S. Cl.
CPC .............. *G09B 9/003* (2013.01); *G09B 5/02* (2013.01)

(58) Field of Classification Search
CPC .......................... G06T 19/006; G06T 19/20
See application file for complete search history.

(56) References Cited

U.S. PATENT DOCUMENTS

| 2008/0111832 | A1* | 5/2008 | Emam | G02B 27/017 345/633 |
| 2009/0293012 | A1* | 11/2009 | Alter | G01C 21/20 715/810 |
| 2012/0087580 | A1* | 4/2012 | Woo | G06T 15/20 382/165 |
| 2012/0162372 | A1* | 6/2012 | Ghyme | G06T 19/006 348/46 |
| 2014/0354515 | A1* | 12/2014 | LaValle | G02B 27/017 345/8 |
| 2015/0091941 | A1* | 4/2015 | Das | A63F 13/23 345/633 |

* cited by examiner

*Primary Examiner* — David L Lewis
*Assistant Examiner* — Eric M Thomas
(74) *Attorney, Agent, or Firm* — Suiter Swantz pc llo

(57) ABSTRACT

A computer system with an augmented reality display renders one or more virtual training elements in a real world environment. Cameras analyze the local real-world environment to produce a detailed terrain map which is used to more accurately locate the virtual training elements. The cameras also track the movement of the trainee by recognizing terrain features and deriving such movement based on changes from one scan to the next, and potentially based on GPS and inertial management unit data. A centralized computer system correlates terrain maps from a plurality of trainees and defines real-world locations for virtual training elements, then transmitting the virtual training elements to the plurality of trainees.

14 Claims, 13 Drawing Sheets

SIMULATION AND TRAINING WITH VIRTUAL PARTICIPANTS IN A REAL-WORLD ENVIRONMENT

BACKGROUND

Military training is cost prohibitive and sometimes dangerous. It takes an enormous amount of resources in personnel and equipment, as well as access to representative sites in order to most accurately reproduce real-world battlefield scenarios. To improve safety and reduce costs, various levels of simulation are employed; however, simulated training solutions substitute a virtual environment for real-world environments. This limitation introduces a reduction in training effectiveness, as operating in a virtual environment is considerably different as compared to navigating a physically tangible environment.

Current simulation solutions allow one or more live trainees to train using simulated equipment within a virtual environment, but trainee interaction with these virtual environments is restricted and not physically correlated to a real environment. Furthermore, virtual environment databases take time and resources to build and can realistically only contain a limited amount of detail, authenticity, and locations. Oftentimes, a suitable real environment is available if not trying to accommodate a large number of other resources. Consequently, there is a need for training solutions that simulate costly personnel and equipment in a real-world environment.

SUMMARY

In one aspect, embodiments of the inventive concepts disclosed herein are directed to a computer system with an augmented reality display to render one or more virtual training elements in a real world environment.

In a further aspect, a computer system in a centralized control center correlates terrain maps from a plurality of trainees and defines real-world locations for one or more virtual training elements. The virtual training elements and real-world locations are then transmitted to each of the plurality of trainees.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
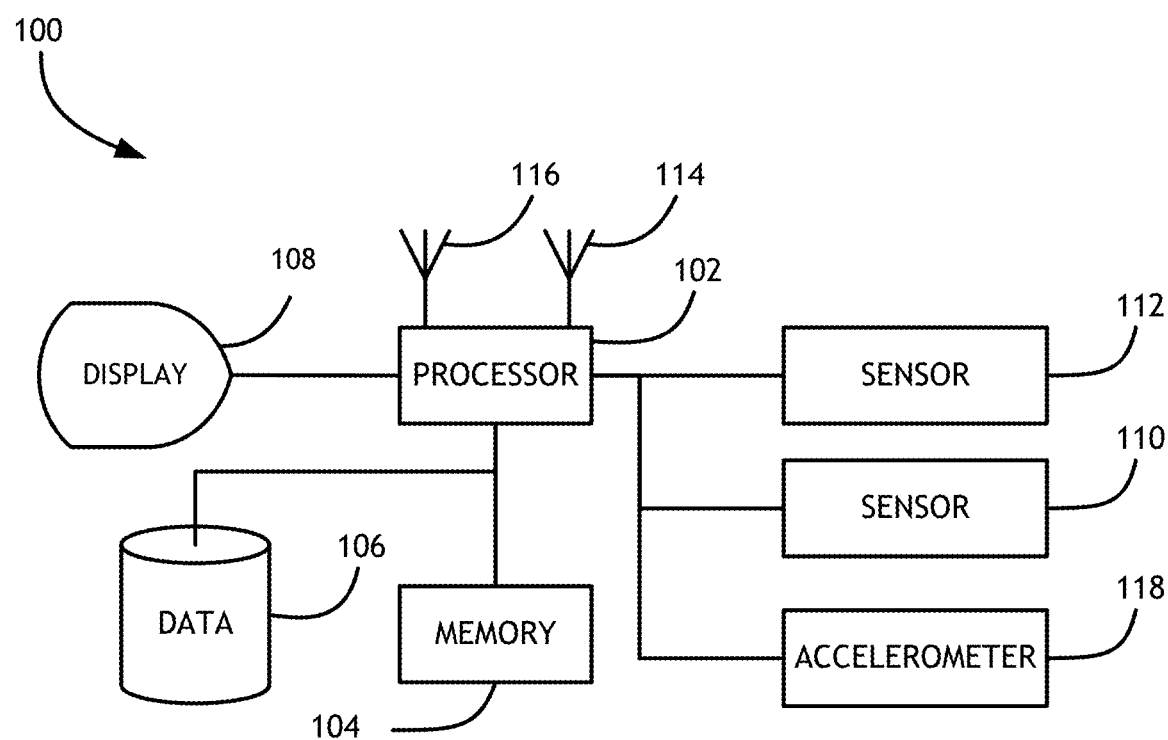
FIG. 1 shows a block diagram of an exemplary embodiment of a system for implementing the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a mobile computer system for producing an augmented reality environment populated with battlefield training elements.

Referring to FIG. 1, a block diagram of an exemplary embodiment of a system 100 for implementing the inventive concepts disclosed herein is shown. The system 100 includes a processor 102, memory 104 connected to the processor 102 for storing processor executable code, a data storage element 106 connected to the processor 102 for maintaining a local terrain map, and a display 108 with augmented reality functionality connected to the processor 102. The processor 102 renders training elements on the display 108, such as virtual soldiers and virtual battlefield features, integrated with real-world terrain based on the local terrain map.

In some embodiments, the system 100 also includes one or more sensors 110, 112 connect to the processor 102 for mapping local terrain to generate the local terrain map. For example, the sensors 110, 112 may comprise a system of cameras configured to produce a three-dimensional image of the local terrain; the processor 102 may then implement feature recognition algorithms. Alternatively, or in addition, the sensors 110, 112 may comprise a set of spatial depth sensor at a fixed relative location and orientation on a person such that as the person moves, a terrain map may be generated.

In some embodiments, information from the sensors 110, 112 may be correlated to an existing terrain map based on a global location signal such as from the Global Positioning System (GPS) received through an antenna 114 connected to the processor.

In some embodiments, the processor 102 receives a data from a remote command center via a data communication device 116. Such data may include a local terrain map, one or more sets of virtual training elements, and location data corresponding to a placement for each of the one or more virtual training elements.

In some embodiments, the system 100 also includes a kill switch 120 connected to the processor 102 to immediately disable all virtual training elements; for example, when a trainee becomes disoriented.

Figure 2:
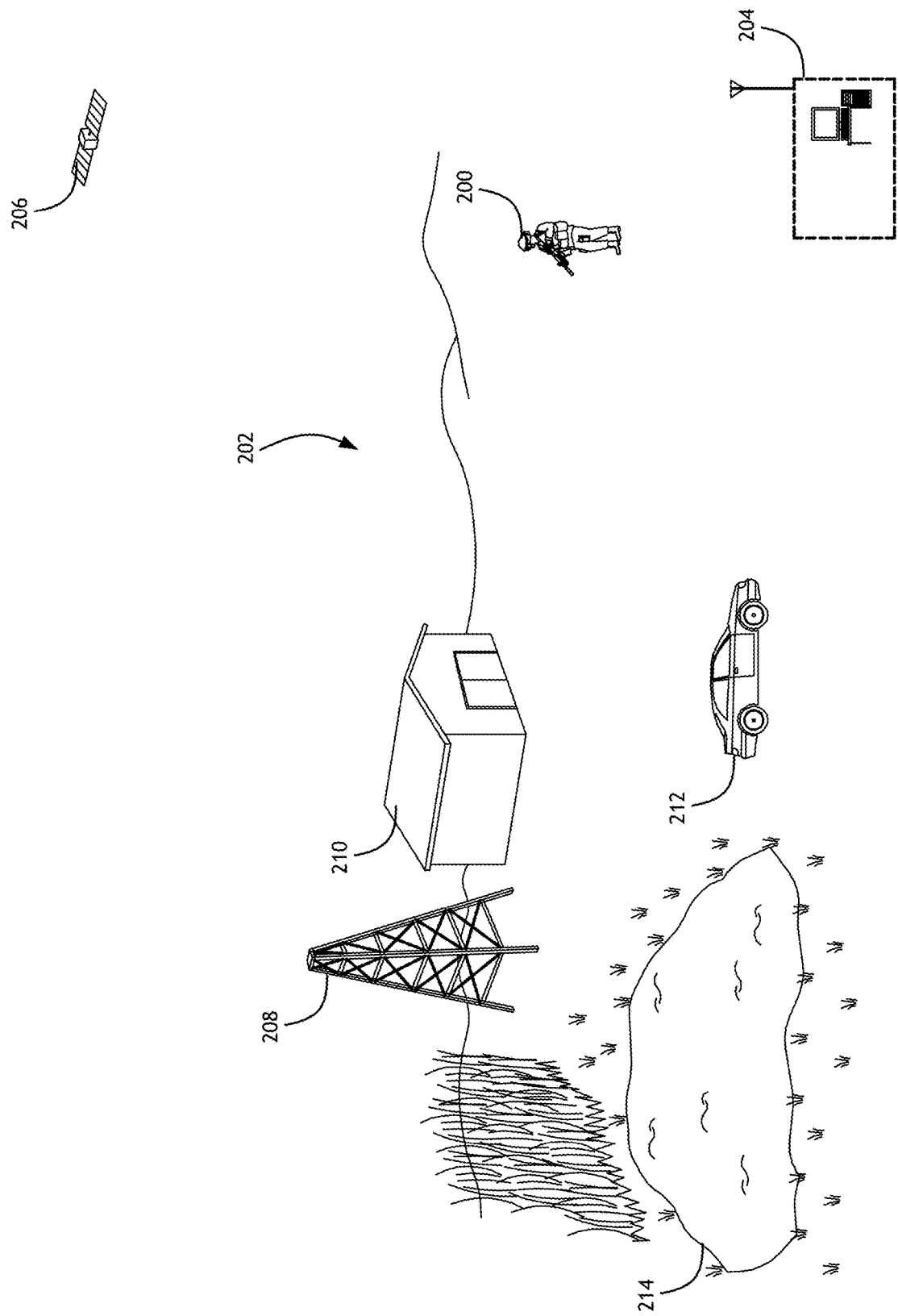
FIG. 2 shows an environmental view of exemplary terrain suitable for use with embodiments of the inventive concepts disclosed herein.

Referring to FIG. 2, an environmental view of exemplary terrain suitable for use with embodiments of the inventive concepts disclosed herein is shown. A trainee 200 is equipped with a personal computer system having sensors and an augmented reality display system incorporated into a helmet to produce virtual training elements incorporated into a real environment 202. The trainee 200 may be in data communication with a centralized control center 204, either directly or via a remote communication system 206, such as a satellite communication network.

In some embodiments, the real environment 202 includes features that may be incorporated into the virtual training elements. For example, the real environment 202 may include man-made elements such as towers 208, buildings 210, or vehicles 212, or natural elements such as bodies of water 214.

Figure 3:
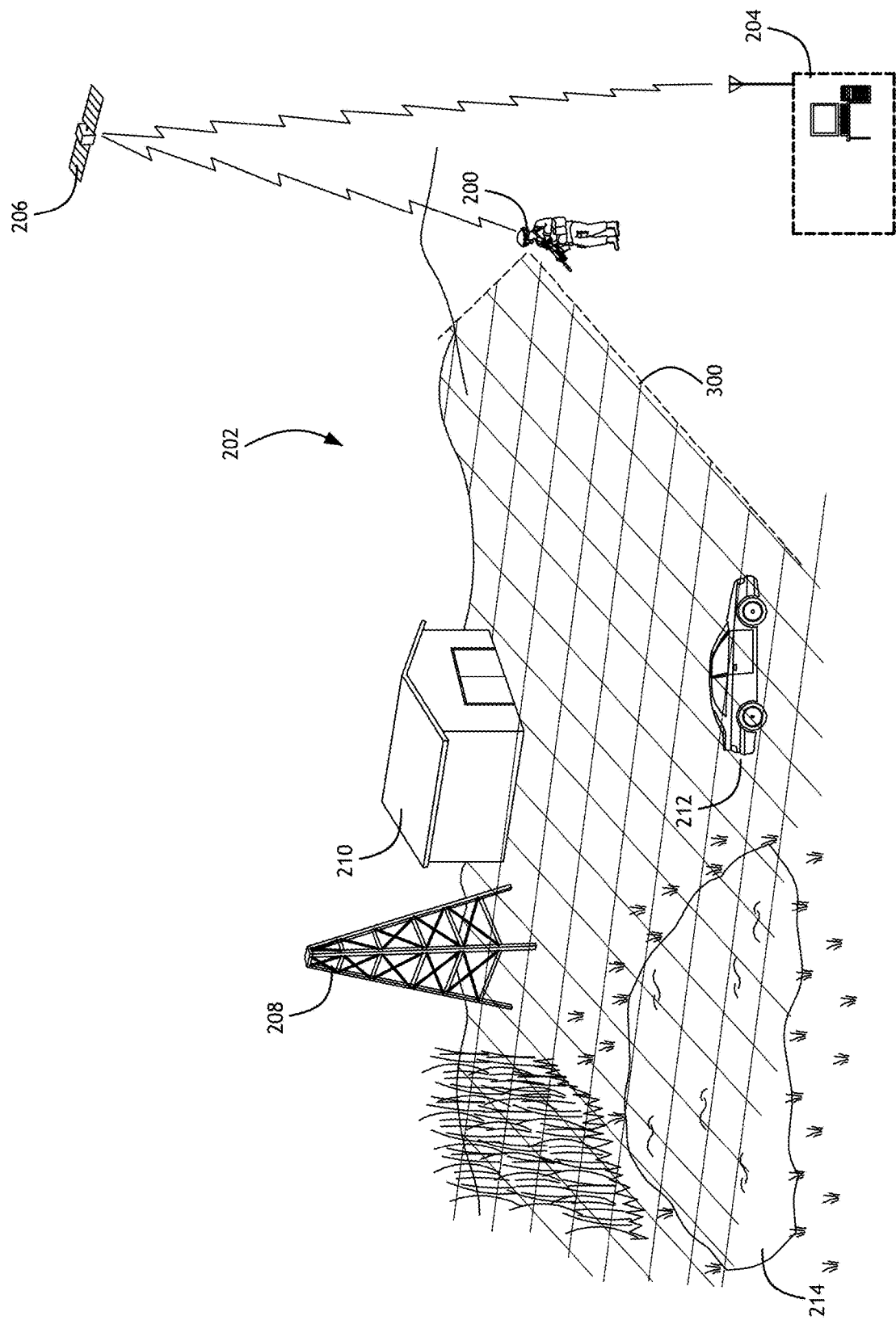
FIG. 3 shows an environmental view of exemplary terrain being scanned for use according to embodiments of the inventive concepts disclosed herein.

Referring to FIG. 3, an environmental view of exemplary terrain being scanned for use according to embodiments of the inventive concepts disclosed herein is shown. The trainee's 200 personal computer system scans 300 the local real terrain via sensors such as a laser scanning system, an ultra-sonic scanning system, or a multi-camera 3D system. In some embodiments, the sensors may be affixed to known locations on the trainee 200, such as the trainee's 200 helmet. Terrain scanning produces a detailed map of topographical features such as elevation changes, and terrain features such as the towers 208, buildings 210, vehicles 212, or bodies of water 214.

In some embodiments, where the trainee's 200 personal computer system is in data communication with the centralized control center 204, either directly or via a remote communication system 206, the detailed map of topographical features may be incorporated into a more general terrain map. The centralized control center 204 may identify virtual training elements specifically designed for integration with the existing terrain features.

In some embodiments, the centralized control center 204 receives and correlates scans 300 from multiple trainees 200 to produce the detailed terrain map, potentially from multiple angles. The centralized control center 204 may use the correlated scans 300 to identify the location of the corresponding trainee 200 in the real environment 202. In some embodiments, the centralized control center 204 may also receive GPS data from each trainee 200 and use the correlated scan 300 to further refine the GPS reported location of each trainee 200.

Figure 4:
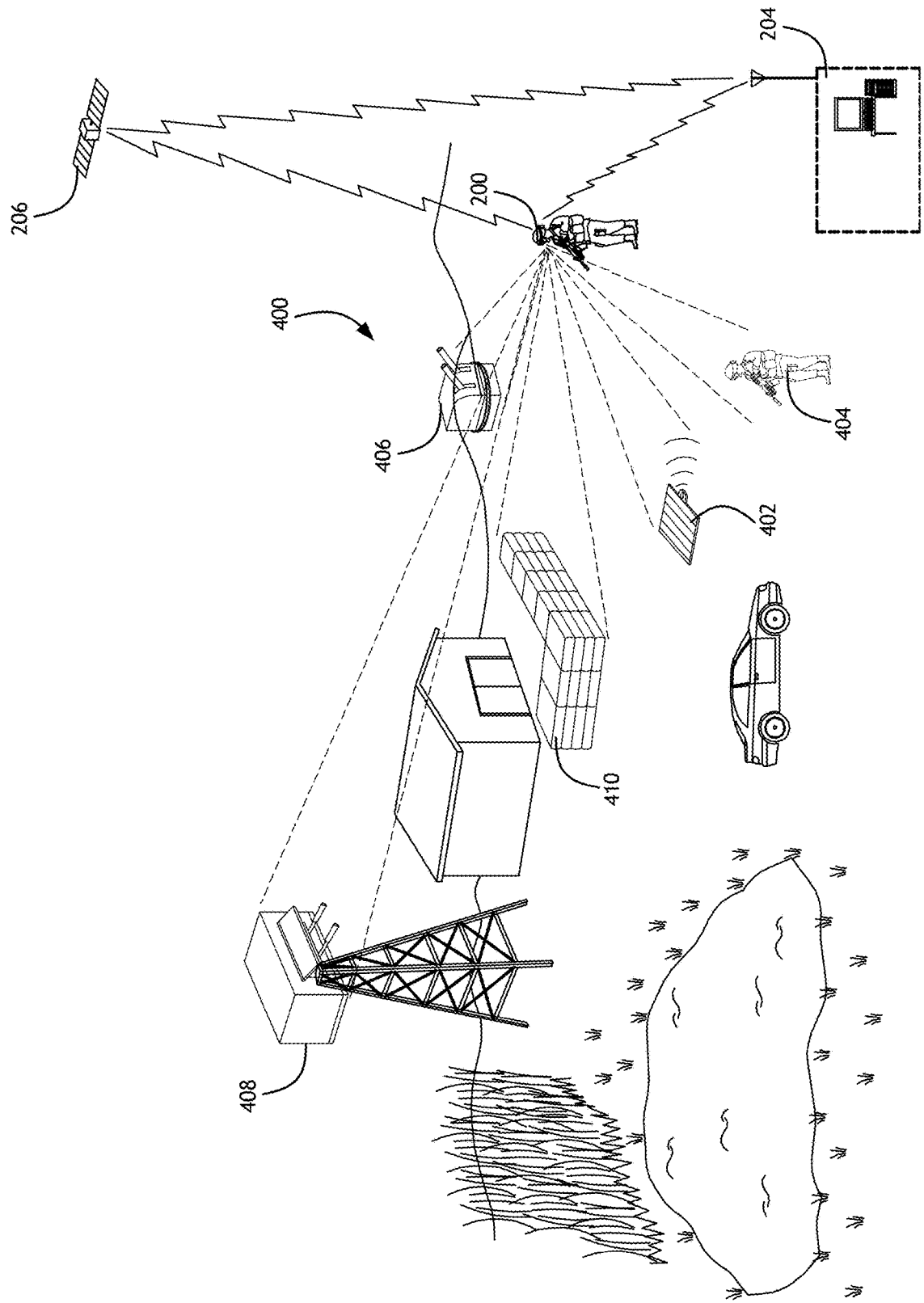
FIG. 4 shows an environmental view of exemplary terrain incorporating projected training elements according to embodiments of the inventive concepts disclosed herein.

Referring to FIG. 4, an environmental view of exemplary terrain incorporating projected training elements according to embodiments of the inventive concepts disclosed herein is shown. The trainee's 200 personal computer system renders a virtual training environment 400 comprising a plurality of virtual training elements 402, 404, 406, 408, 410. Each of the virtual training elements 402, 404, 406, 408, 410 is associated with a real-world location in the virtual training environment 400 such that each virtual training element 402, 404, 406, 408, 410 is rendered on the trainee's 200 display to appear to be located at the associated location. As the trainee 200 moves, sensors incorporated in the trainee's 200 personal computer system track changes to the trainee's 200 location and orientation to thereby re-render the virtual training element 402, 404, 406, 408, 410 accordingly. In some embodiments, the sensors comprise cameras wherein the personal computer system is configured for motion tracking. Alternatively, or in addition, the sensors may comprise one or more accelerometers, magnetometers, gyroscopes, altimeters, or other inertial management units to track the movement of the display (generally corresponding to the movement of the trainee's 200 head) and a GPS antenna to track the trainee's 200 gross movements around the virtual training environment 400.

In some embodiments, where the trainee's 200 personal computer system is in data communication with the centralized control center 204, either directly or via a remote communication system 206, the centralized control center 204 may identify locations to associate with each of the virtual training element 402, 404, 406, 408, 410. In some embodiments, the centralized control center 204 instructs personal computer systems for multiple trainees 200 to render the same virtual training element 402, 404, 406, 408, 410 at the same associated real-world locations. Each trainee's 200 personal computer system then tracks changes in the location and orientation of the trainee 200 to render the virtual training element 402, 404, 406, 408, 410 to appear to be in the same real-world location.

In some embodiments, where some of the virtual training element 402, 404, 406, 408, 410 are mobile in nature, such as virtual drones 402 or virtual soldiers 404, the centralized control center 204 may transmit updated locations associated with each mobile virtual element 402, 404. Each trainee's 200 personal computer system re-renders the mobile virtual elements 402, 404 at the updated real-world location.

Figure 5A:
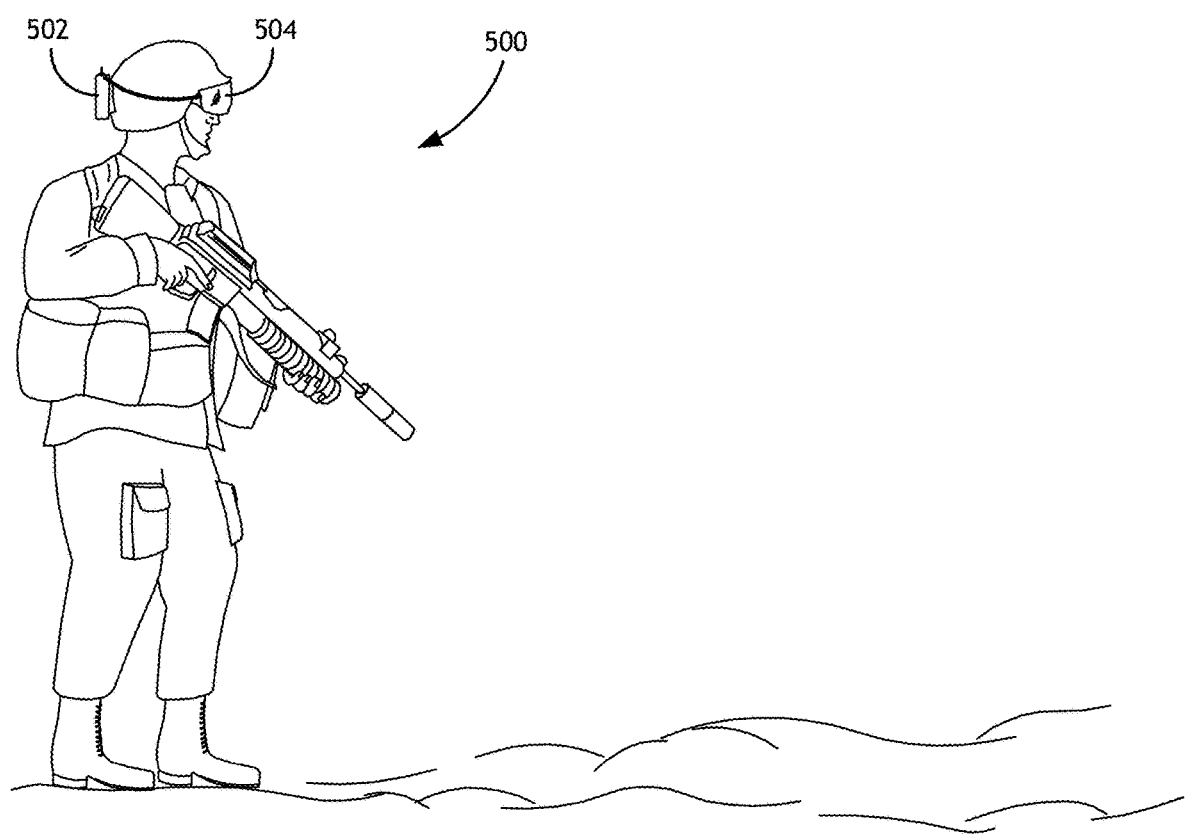
FIG. 5A shows an environmental view of a trainee equipped for implementing an exemplary embodiment of the inventive concepts disclosed herein.
Figure 5B:
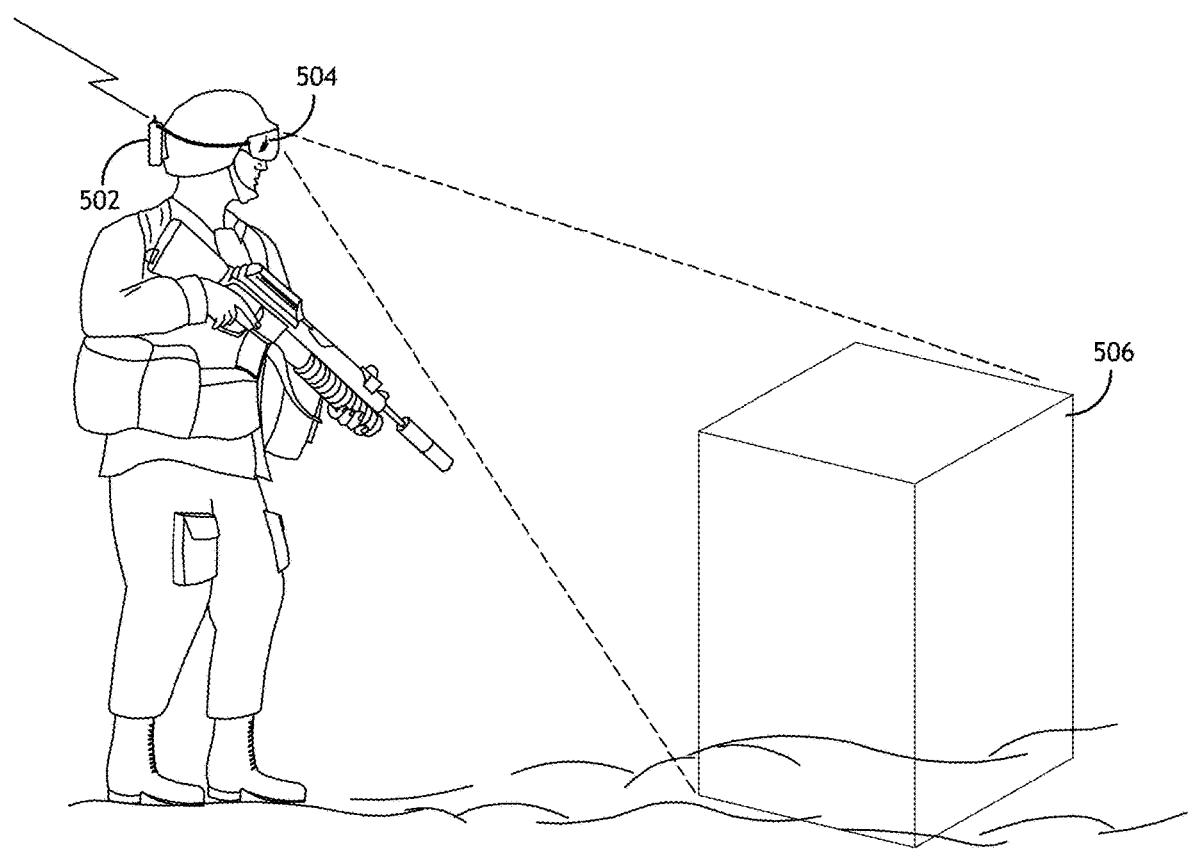
FIG. 5B shows an environmental view of a trainee equipped for scanning a terrain according to an exemplary embodiment of the inventive concepts disclosed herein.
Figure 5C:
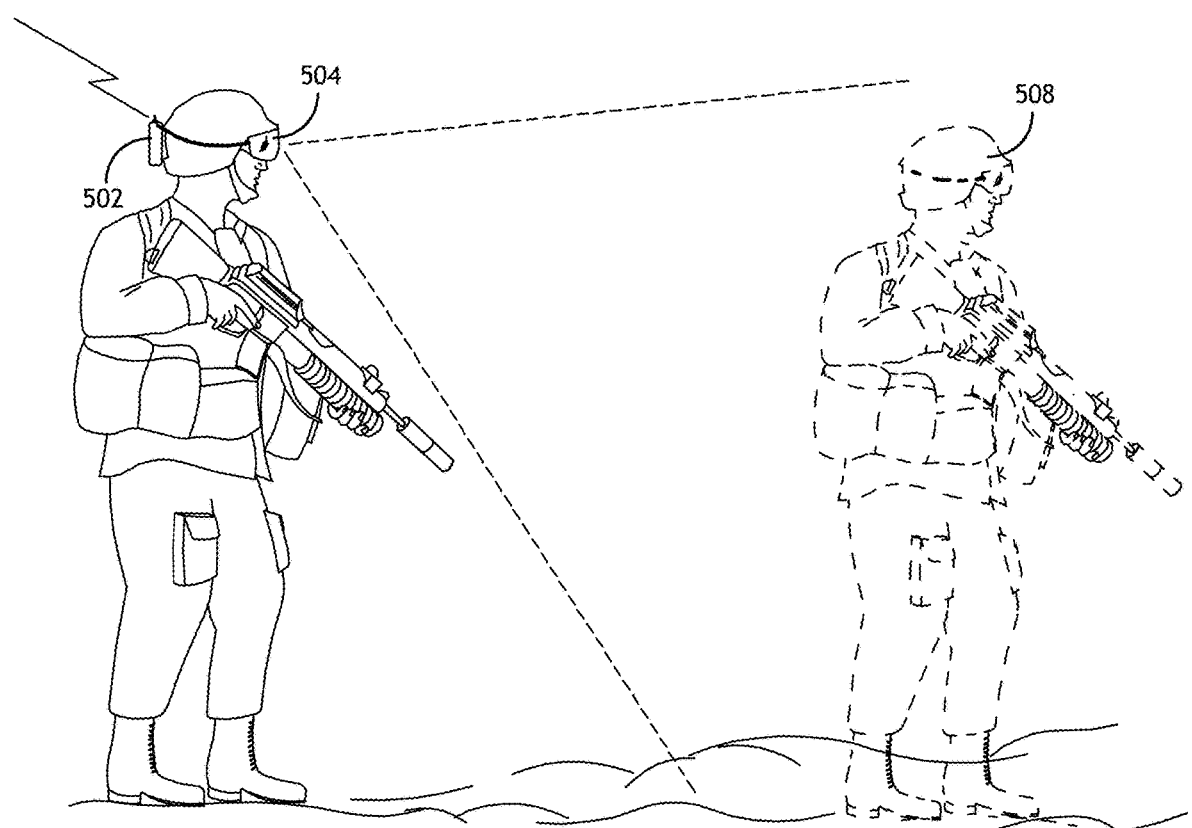
FIG. 5C shows an environmental view of a trainee equipped for implementing an exemplary embodiment of the inventive concepts disclosed herein, projecting a virtual soldier.

Embodiments of the inventive concepts disclosed herein maintain the cost effectiveness of virtual elements 402, 404, 406, 408, 410 but improve training effectiveness by placing virtual elements 402, 404, 406, 408, 410 into the backdrop of a real physical location. Trainees 200 in a physical location would see virtual elements 402, 404, 406, 408, 410 overlaid on the real-world using see-through helmet mounted displays (HMD). In some embodiments, the overlay is enabled by a multi-spectral vision system (MVS), Referring to FIGS. 5A, 5B, and 5C, environmental views of a trainee equipped for implementing exemplary embodiments of the inventive concepts disclosed herein are shown. A trainee 500 in a real-world environment is equipped with a personal computer system 502 connected to an augmented reality display device 504. In some embodiments, the personal computer system 502 includes sensors to scan discrete areas 506 of a real-world training environment intended for virtual training elements such as virtual soldiers 508. The personal computer system 502 scans the discrete areas 506 to produce detailed terrain maps; the virtual soldier 508 may thereby be rendered so as to be incorporated into the discrete areas 506 in a realistic way. For example, a predefined model of the virtual soldier 508 may be defined with movement patterns conforming to an invisible digital landscape; the invisible digital landscape may then be altered to conform to the real-world environment based on the detailed terrain maps of the discrete areas 506 as the trainee 500 moves or issues orders to move the virtual soldier 508. A trainee 500 may simulate leading a platoon down a real hillside, posting virtual artillery units in strategic locations along the way.

Figure 6A:
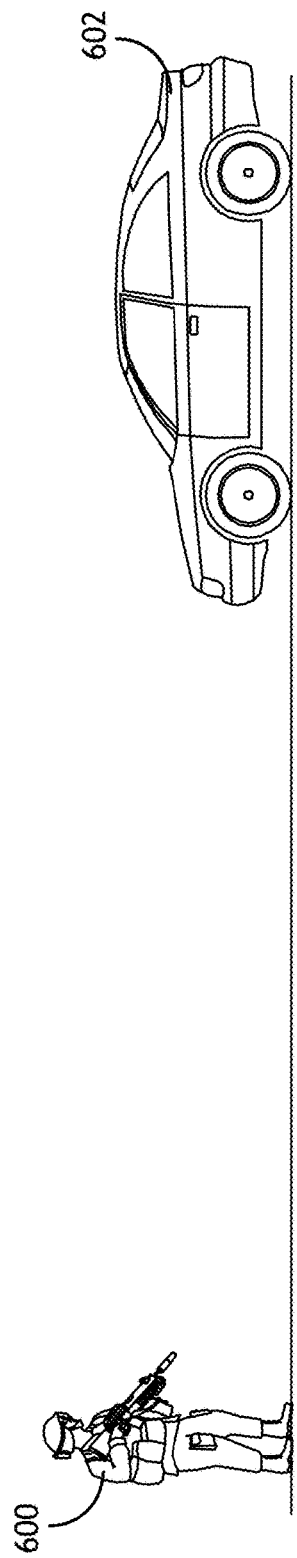
FIG. 6A shows an environmental view of a trainee equipped for implementing an exemplary embodiment of the inventive concepts disclosed herein.
Figure 6B:
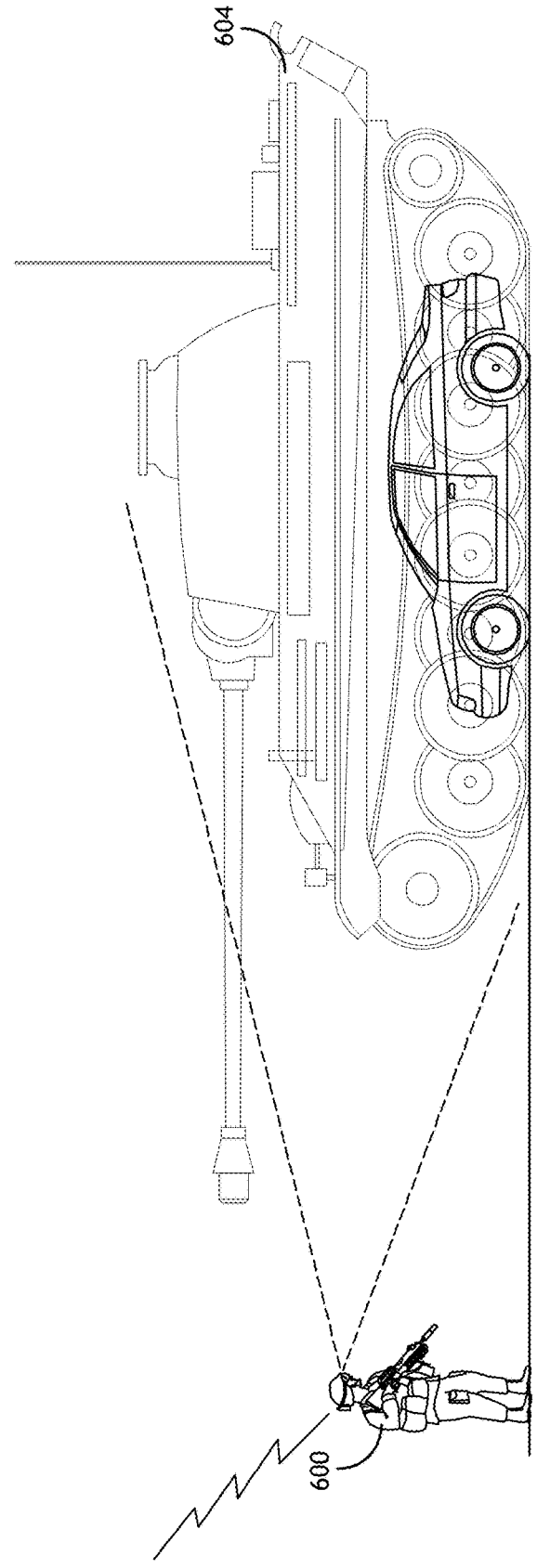
FIG. 6B shows an environmental view of a trainee equipped for projecting a mobile training element according to an exemplary embodiment of the inventive concepts disclosed herein.

Referring to FIGS. 6A and 6B, environmental views of a trainee equipped for implementing exemplary embodiments of the inventive concepts disclosed herein are shown. A trainee 600 in a real-world environment is equipped with a personal computer system connected to an augmented reality display device. The real-world environment includes real-world mobile elements 602 such as a car. The personal computer system, or alternatively a remote centralized control center, tags the mobile element 602 which is then associated with a mobile virtual training element 604 such as a tank. Sensors connected to the personal computer system of the trainee 600 continuously track the real-world mobile element 602 and renders the virtual training element 604 accordingly.

In some embodiments, where the personal computer system of the trainee 600 is in data communication with a centralized control center, tagged real-world mobile elements 602 may be tracked via sensors from a plurality of trainees 600 across a large real-world environment, even where one trainee 600 loses sight of the mobile element 602.

Figure 7:
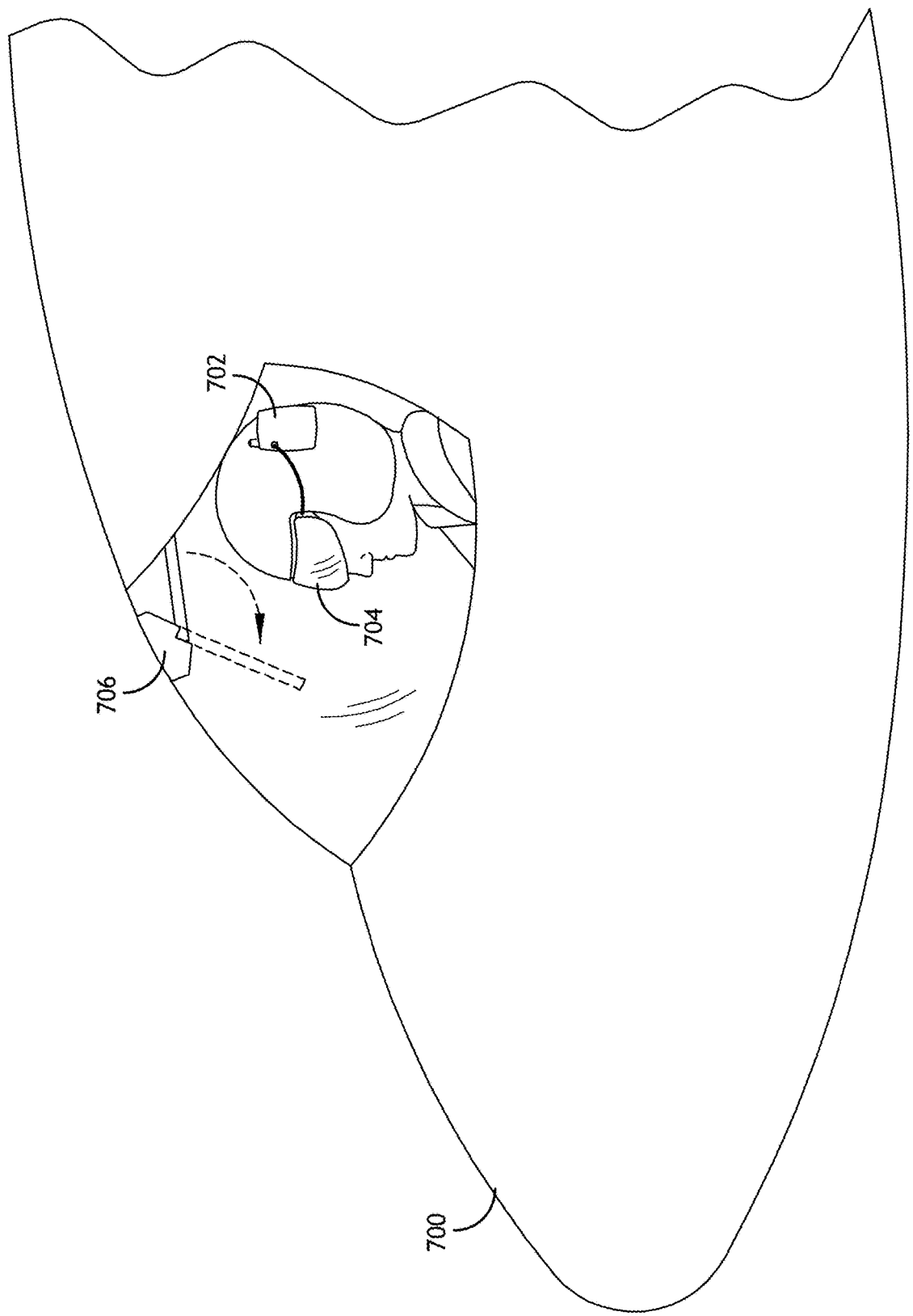
FIG. 7 shows an environmental view of an aircraft including exemplary embodiments of the inventive concepts disclosed herein.

Referring to FIG. 7, an environmental view of an aircraft 700 including exemplary embodiments of the inventive concepts disclosed herein is shown. The aircraft 700 includes a display controller 702, either incorporated into an onboard computer system or incorporated into a personal computer system. The display controller 702 renders virtual elements onto a display device 704, 706 adapted for augmented reality. In some embodiments, the display controller 702 renders virtual elements on a helmet mounted display device 704, while in other embodiments the display controller 702 renders virtual elements on a heads-up display device 706.

Figure 8A:
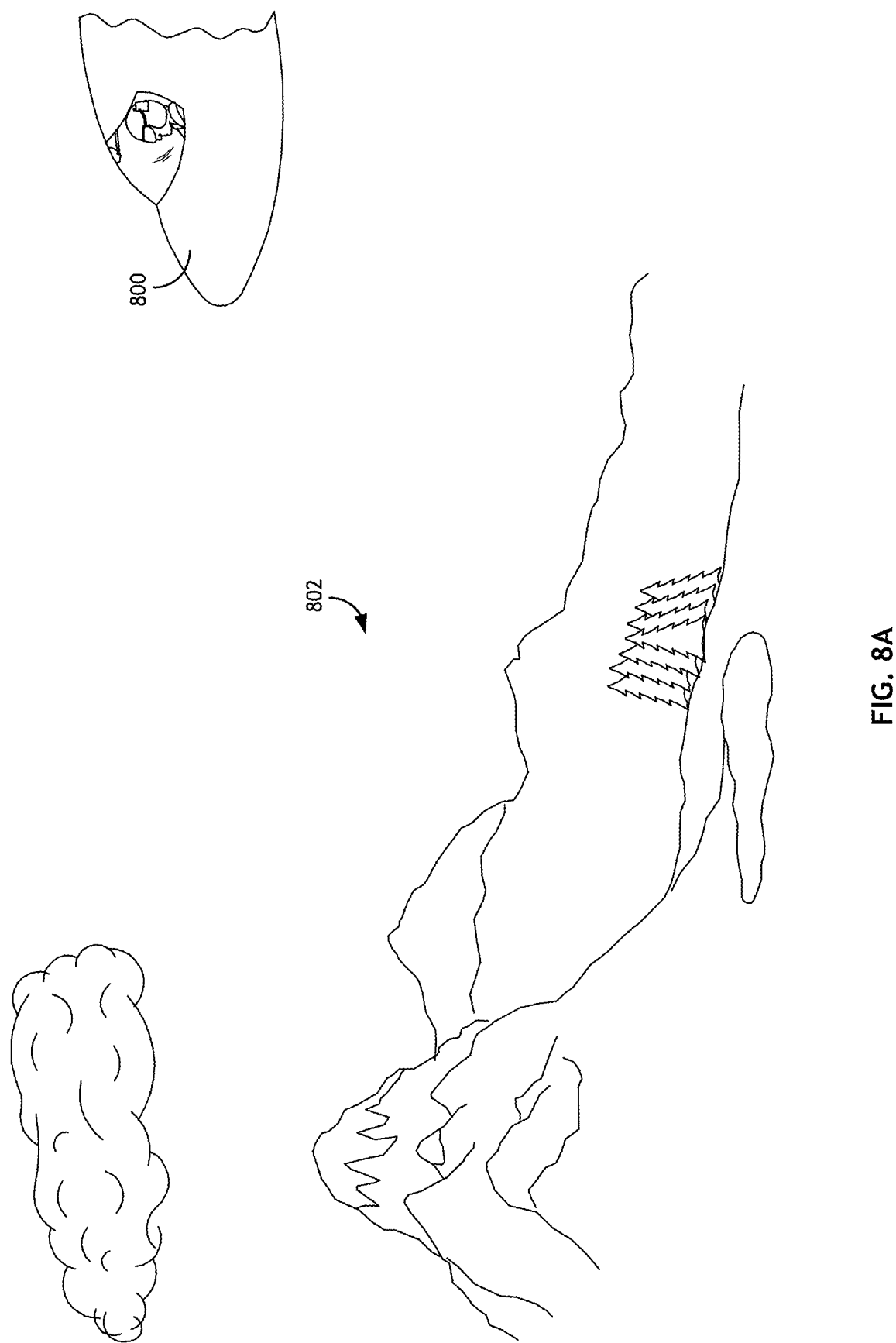
FIG. 8A shows an environmental view of an aircraft in terrain suitable for use with exemplary embodiments of the inventive concepts disclosed herein.
Figure 8B:
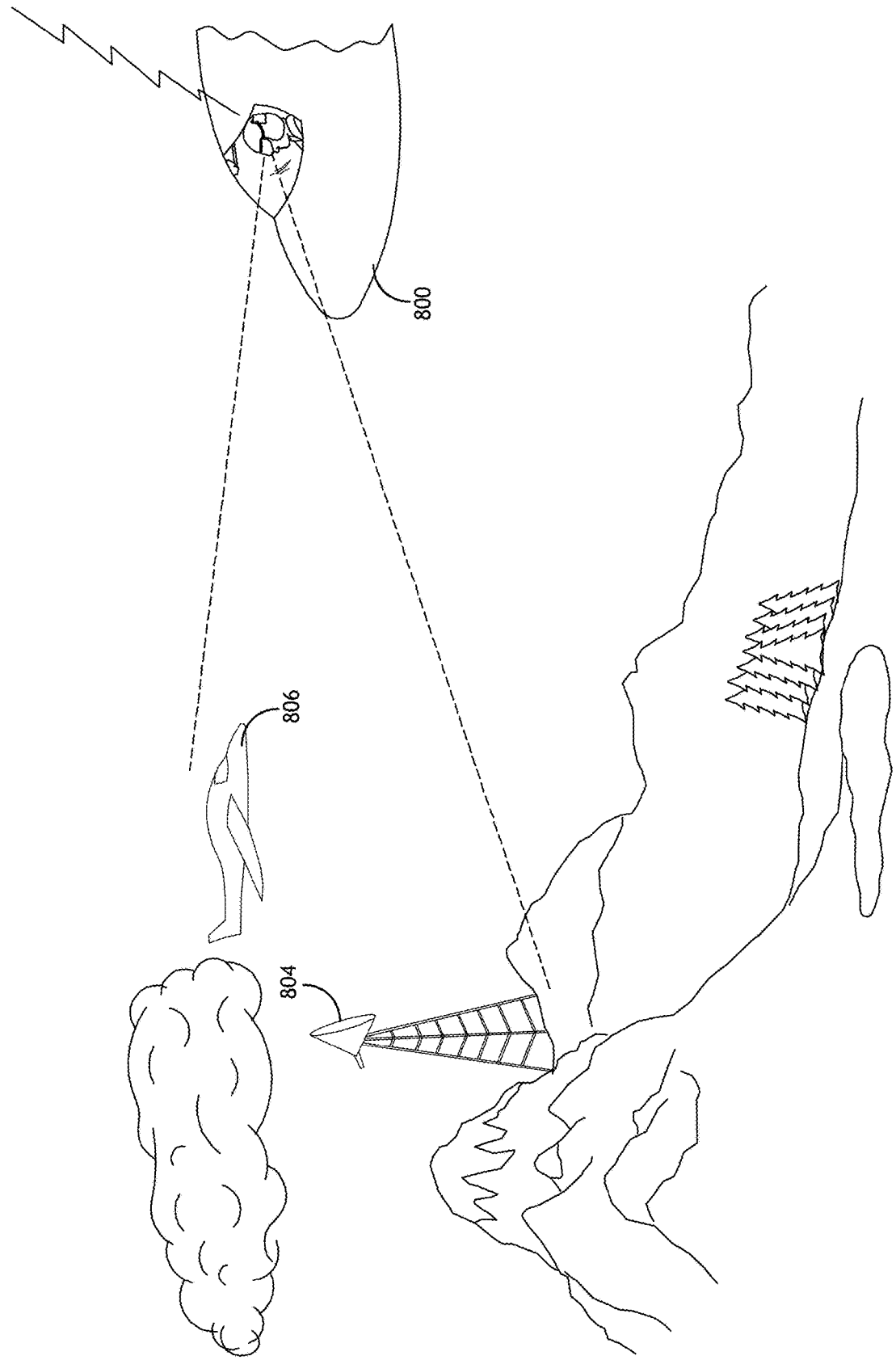
FIG. 8B shows an environmental view of an aircraft in terrain incorporating projected training elements according to embodiments of the inventive concepts disclosed herein.

Referring to FIGS. 8A and 8B, environmental views of an aircraft 800 in terrain 802 suitable for use with exemplary embodiments of the inventive concepts disclosed herein are shown. The aircraft 800 may include a computer system with cameras or other sensors for scanning the terrain 802 to produce a local terrain map. Alternatively, or in addition, the computer system onboard the aircraft 800 includes a terrain map or receives a terrain map from a centralized control center. The computer system renders virtual terrain features 804 to conform to a particular location in the terrain 802 based on the terrain map. In some embodiments, the computer system may render virtual aircraft 806 in addition to virtual terrain features 804.

Figure 9:
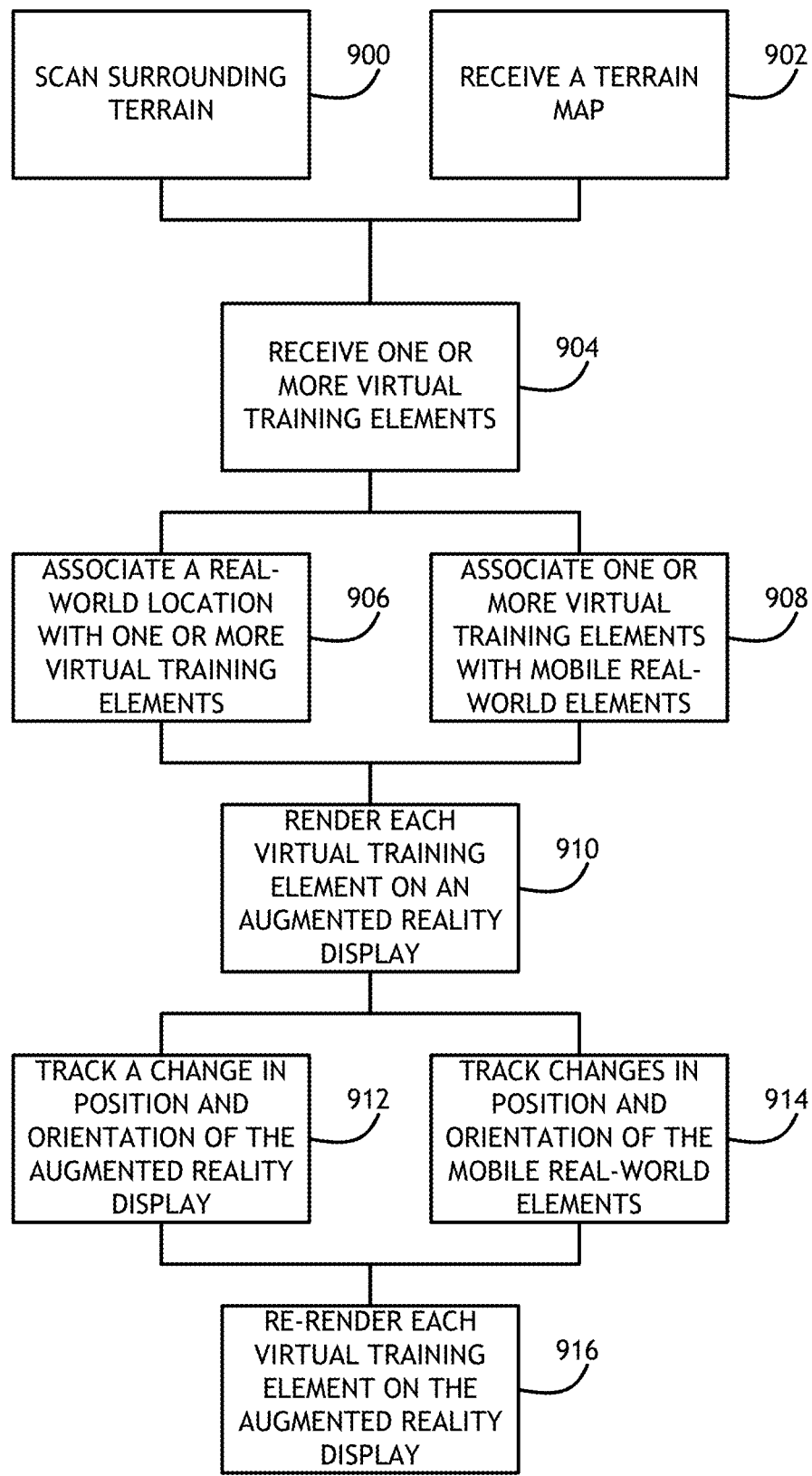
FIG. 9 shows a flowchart for a method of incorporating projected training elements into a real-world environment is shown.

Referring to FIG. 9, a flowchart for a method of incorporating projected training elements into a real-world environment is shown is shown. A trainee equipped with a mobile personal computer system may scan 900 local terrain to create a detailed terrain map. Alternatively, or in addition, the personal computer system may receive 902 an existing terrain map from a centralized control center. The personal computer system also receives 904 one or more virtual training elements. Each virtual training element is associated 906 with a real-world location, or associated 908 with a mobile real-world element if the virtual training element represents a mobile training element such as a tank. In such embodiment, it may be desirable for the mobile training element to move around the terrain without a predefined movement pattern, substantially at random. Associating 908 the mobile training element with a mobile real-world element allows participants to affect the movement of the mobile training element without complicated algorithms.

Once the location of each virtual training element is associated 906, 908 with a real-world location or device, the virtual training elements are rendered 910 in an augmented reality enabled display. In some embodiments, the augmented reality display may be a helmet mounted display. As the trainee moves, sensors connected to the personal computer system allow the personal computer system to track 912 such changes to position and orientation. In some embodiments, the sensors comprise a GPS antenna and one or more inertial management units. Alternatively, or in addition, cameras continuously monitor the local terrain and, based on identified landmarks, the personal computer system derives changes in position and orientation.

Where the virtual training elements include mobile training elements, the personal computer system tracks 914 changes to the position and orientation of the corresponding mobile real-world elements through one or more connected cameras. The personal computer system then re-renders 916 each of the virtual training elements to either maintain the appearance of their real-world location or account for their movement to appear in a new real-world location.

Figure 10:
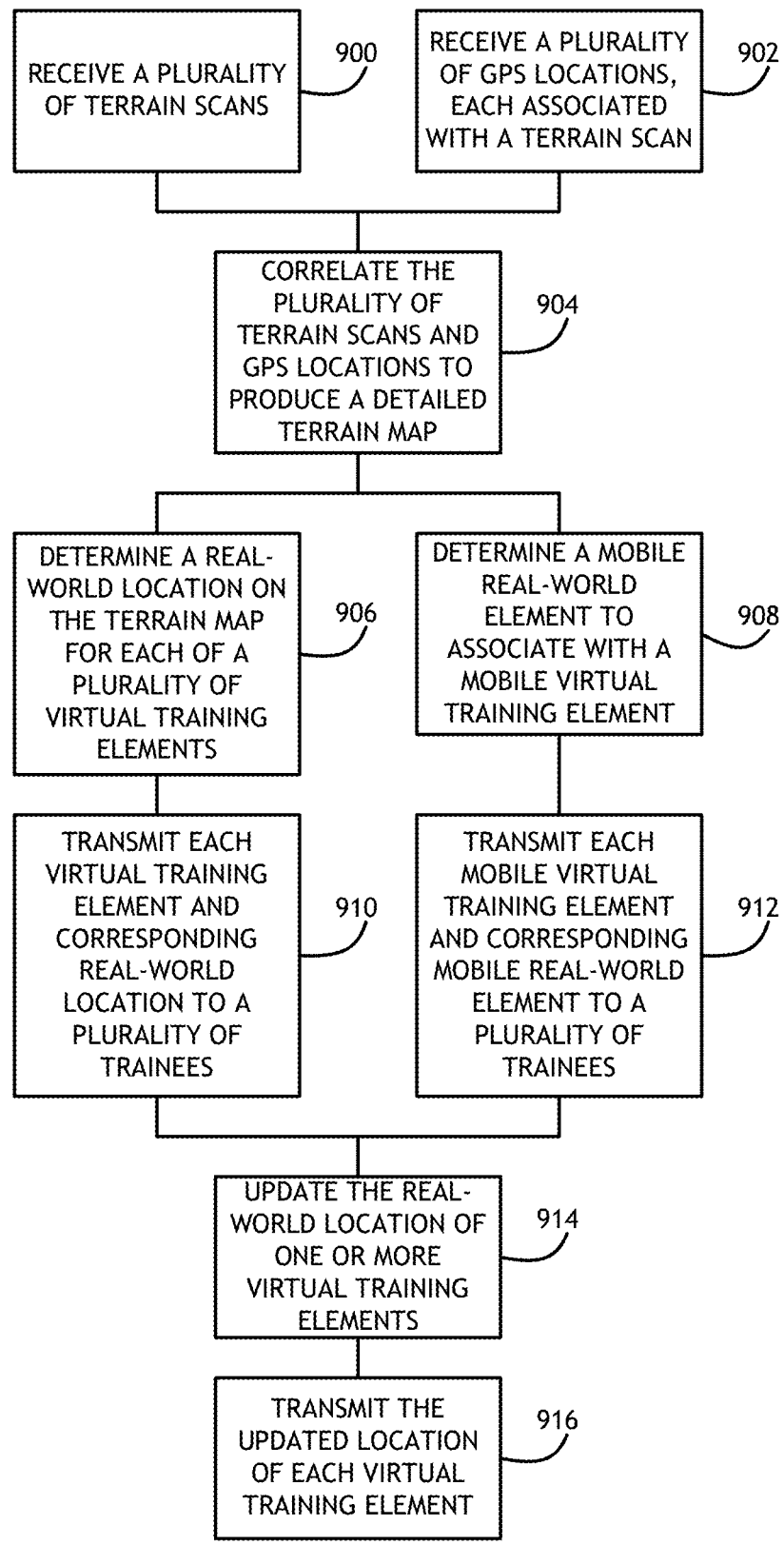
FIG. 10 shows a flowchart for a method of incorporating projected training elements into a real-world environment is shown.

Referring to FIG. 10, a flowchart for a method of incorporating projected training elements into a real-world environment is shown. A computer system in a centralized control center receives 1000 a plurality of terrain scans, and receives 1002 GPS locations corresponding to each of the plurality of terrain scans. The computer system correlates 1004 the plurality of terrain scans and GPS locations to produce a detailed terrain map. The computer system then determines 1006 a real-world location in the detailed terrain map for each of a plurality of virtual training elements and transmits 1010 the virtual training element and corresponding real-world location to each of a plurality of trainees.

In some embodiments, the computer system also determines 1008 a mobile real-world element to associate with a mobile virtual training element and transmits 1012 the mobile virtual training elements and corresponding to mobile real-world element to the plurality of trainees.

The computer system continuously or periodically updates 1014 the real-world location of one or more of the virtual training elements and transmits 1016 the updated locations to the plurality of trainees.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A computer apparatus comprising:
   an augmented reality display;
   at least one camera;
   a plurality of spatial depth sensors disposed on a person; and
   a memory storing processor executable code, connected to at least one processor, for configuring the at least one processor to:
   receive a global terrain map from a centralized control center;
   scan local terrain with the at least one camera;
   identify one or more local terrain features; and
   create a detailed local terrain map based on the one or more local terrain features;
   receive data from the plurality of spatial depth sensors as the person moves around an environment;
   continuously augment the global terrain map based on the data from the plurality of spatial depth sensors and the detailed local terrain map;
   receive at least one virtual training element;
   identify at least one location on the global terrain map comprising local terrain features;
   render the at least one virtual training element in the augmented reality display to appear at a real-world location corresponding to the at least one location;
   identify a change in location and orientation of the augmented reality display;
   re-render the at least one virtual training element in the augmented reality display such that the virtual training element appears to remain at the real-world location;
   identify at least one mobile real-world automobile;
   associate a virtual tank with the at least one mobile real-world automobile; and
   continuously render the virtual tank in the augmented reality display to appear at a real-world location and orientation obscuring the mobile real-world automobile from a user.

2. The computer apparatus of claim 1, wherein the processor executable code further configures the at least one processor to transmit the detailed local terrain map to a centralized control center.

3. The computer apparatus of claim 1, further comprising at least one inertial management unit in data communication with the at least one processor, wherein:
   the processor executable code further configures the at least one processor to determine a change in orientation based on the at least one inertial management unit; and
   identifying the change in location and orientation comprises referencing the at least one inertial management unit.

4. The computer apparatus of claim 1, further comprising a Global Positioning System (GPS) antenna in data communication with the at least one processor, wherein:
   the processor executable code further configures the at least one processor to establish a GPS location via the GPS antenna; and
   identifying the at least one location comprises referencing the GPS location.

5. The computer apparatus of claim 1, further comprising a kill switch in data communication with the at least one processor, wherein the processor executable code further configures the at least one processor to de-render all of the virtual training elements.

6. A method for simulating training elements in a real-world environment comprising:
   receiving data from a plurality of spatial depth sensors disposed on a person as the person moves around an environment;
   receive a global terrain map from a centralized control center;
   scan local terrain with the at least one camera;
   identify one or more local terrain features;
   create a detailed local terrain map based on the one or more local terrain features;
   continuously augmenting the global terrain map based on the data from the plurality of spatial depth sensors;
   receiving at least one virtual training element;
   identifying at least one location on the global terrain map comprising local terrain features;
   rendering the at least one virtual training element in an augmented reality display to appear at a real-world location corresponding to the at least one location;
   identifying a change in location and orientation of the augmented reality display;
   re-rendering the at least one virtual training element in the augmented reality display such that the virtual training element appears to remain at the real-world location;
   identifying at least one mobile real-world automobile;

associating a virtual tank with the at least one mobile real-world automobile;

tracking a movement of the mobile real-world automobile; and continuously re-rendering the virtual tank in the augmented reality display to conform to the tracked movement and obscure the real-world automobile from a user.

7. The method of claim 6, transmitting the detailed local terrain map to a centralized control center.

8. The method of claim 6, further comprising:

determining a change in orientation based on the at least one inertial management unit; and referencing the at least one inertial management unit when identifying the change in location and orientation.

9. The method of claim 6, further comprising:

establishing a GPS location; and referencing the GPS location when identifying the at least one location.

10. The method of claim 6, further comprising de-rendering all of the virtual training elements in response to a kill switch input.

11. A system for simulating training elements in a real-world environment comprising:

at least one data communication device in data communication with a plurality of trainees, each of the plurality of trainees having a plurality of spatial depth sensors;

a memory storing processor executable code, connected to at least one processor, for configuring the at least one processor to:

receive data from the plurality of spatial depth sensors as each trainee moves around an environment;

correlate data from the plurality of spatial depth sensors from the plurality of trainees, each trainee associated with a GPS location, such correlation comprising transforming spatial depth sensor data associated with each trainee to refine the GPS location of each trainee;

continuously augment a terrain map based on the data from the plurality of spatial depth sensors;

identify at least one mobile real-world automobile;

associate a virtual tank with the at least one mobile real-world automobile;

continuously transmit a real-world location and orientation of the virtual tank to obscure the mobile real-world automobile from each of the plurality of trainees when rendered, via the at least one data communication device;

identify one or more real-world locations on the terrain map, each of the one or more real-world locations corresponding to a virtual training element;

transmit each virtual training element and corresponding real-world location to each of the plurality of trainees via the at least one data communication device;

update the real-world location corresponding to at least one of the virtual training elements; and transmit the updated real-world location to each of the trainees via the at least one data communication device.

12. The system of claim 11, wherein the processor executable code further configures the at least one processor to:

receive a plurality of detailed local terrain maps from the plurality of trainees;

collate the plurality of detailed terrain maps;

create a wide area detailed terrain map; and transmit the wide area detailed terrain map to the plurality of trainees via the at least one data communication device.

13. The system of claim 11, wherein the processor executable code further configures the at least one processor to:

identify at least one mobile virtual training element;

associate the at least one mobile virtual training element with a mobile real-world element identified via data received from one or more of the plurality of trainees; and transmit each mobile virtual training element and corresponding mobile real-world element to each of the plurality of trainees via the at least one data communication device.

14. The system of claim 11, wherein the processor executable code further configures the at least one processor to:

receive an updated location of at least one virtual training element from one trainee; and transmit the updated location to each of the plurality of trainees.

* * * * *